United States Patent Office 3,425,942
Patented Feb. 4, 1969

---

3,425,942
LUBRICANTS CONTAINING POLYMERS OF AROMATIC N-3-OXOHYDROCARBON-SUBSTITUTED ACRYLAMIDES
Lester E. Coleman, Cleveland, Ohio, assignor to The Lubrizol Corporation, Wickliffe, Ohio, a corporation of Ohio
No Drawing. Filed Sept. 28, 1966, Ser. No. 582,501
U.S. Cl. 252—51.5  5 Claims
Int. Cl. C10m 3/26; C14c 9/00

---

ABSTRACT OF THE DISCLOSURE

Novel N-3-oxohydrocarbon-substituted acrylamides containing an aromatic radical in either the 1 or 3 position on the oxohydrocarbon substituent are prepared by the reaction of acrylonitrile with an aromatic ketone having at least one alpha hydrogen atom, or with a mixture of such a ketone with an aromatic or aliphatic aldehyde or ketone having at least one alpha hydrogen atom, in the presence of sulfuric acid; or by the reaction of acrylonitrile with a β-hydroxy oxohydrocarbon or an α,β-unsaturated oxohydrocarbon derived from said aromatic ketone or mixture. Oil-soluble polymers formed by the polymerization of these acrylamides, and also by the polymerization of acrylamides containing at least two aromatic substituents, one in the 1 position and one in the 3 position of the nitrogen substituent, are useful as viscosity index improvers for lubricating oils.

---

This invention relates to new compositions of matter, both monomeric and polymeric. More particularly, it relates (1) to new monomeric N-3-oxohydrocarbon-substituted acrylamides of the general formula $$R^1-\underset{\underset{R^3}{|}}{\overset{\overset{O}{\|}}{C}}-\underset{\underset{R^5}{|}}{\overset{\overset{R^2}{|}}{C}}-\underset{\underset{H}{|}}{\overset{\overset{R^4}{|}}{C}}-N-\underset{\underset{R^6}{|}}{\overset{\overset{O}{\|}}{C}}-C=CH_2$$

wherein $R^1$ and $R^4$ are alkyl or aryl, with $R^1$ being alkyl if $R^4$ is aryl and aryl if $R^4$ is alkyl; each of $R^2$, $R^3$ and $R^5$ is hydrogen or a hydrocarbon radical; and $R^6$ is hydrogen or a lower alkyl radical; and (2) to polymers prepared from monomers of the general formula $$R^7-\underset{\underset{R^3}{|}}{\overset{\overset{O}{\|}}{C}}-\underset{\underset{R^5}{|}}{\overset{\overset{R^2}{|}}{C}}-\underset{\underset{H}{|}}{\overset{\overset{R^8}{|}}{C}}-N-\underset{\underset{R^6}{|}}{\overset{\overset{O}{\|}}{C}}-C=CH_2$$

wherein each of $R^7$ and $R^8$ is alkyl or aryl, at least one of $R^7$ and $R^8$ being aryl; and $R^2$, $R^3$, $R^5$, and $R^6$ are as defined hereinabove.

The following compounds are illustrative of the monomeric compounds from which the polymers of this invention may be prepared.

N-(1,3-diphenyl-1-methyl-3-oxopropyl)acrylamide

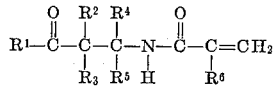

N-(1-methyl-3-phenyl-3-oxopropyl)acrylamide

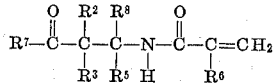

N-(1-phenyl-1-methyl-3-oxopropyl)acrylamide

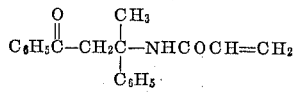

N-(1,1-dimethyl-3-phenyl-3-oxopropyl)methacrylamide

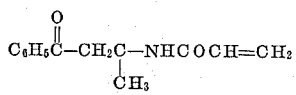

N-(1-methyl-1-phenyl-3-oxobutyl)methacrylamide

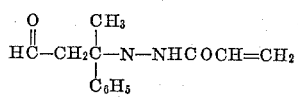

As indicated, the polymeric compositions of this invention are derived from N-3-oxohydrocarbon-substituted acrylamides containing at least one aromatic substituent. Preferably, both $R^7$ and $R^8$ are aromatic and $R^2$, $R^3$ and $R^5$ are hydrogen or aliphatic. All are preferably hydrocarbon radicals, but the term "hydrocarbon" also embraces substantially hydrocarbon radicals containing substituents such as halogen, ether, ester, nitro and the like provided such radicals are present in proportions small enough not to alter significantly the hydrocarbon character of the radicals. The upper limit with respect to the proportions of such substituents in the radical is about 70% by weight.

The substtiuent $R^6$ is preferably hydrogen, but may be a lower alkyl radical (one containing not more than about 10 carbon atoms).

The monomeric compounds of this invention, and the monomeric precursors of the polymeric compounds of this invention, may be prepared by a number of methods. In the preferred method, one mole of an acrylonitrile is reacted with two moles of an aromatic ketone having at least one alpha hydrogen atom, or with two moles of a mixture of such a ketone with an aromatic or aliphatic aldehyde or ketone having at least one alpha hydrogen atom, in the presence of at least one mole of sulfuric acid. This reaction is best carried out at a temperature below about 100° C. A higher temperature appears to promote undesirable side reactions, such as polymerization of the acrylonitrile, or polymerization of the acrylamide product. The preferred reaction temperature is about 0–70° C. The reaction is in most instances exothermic; hence, external cooling may be necessary to maintain the reaction temperature wtihin the stated range.

After the reaction has taken place the reaction mixture is hydrolyzed, preferably by contacting the same with ice or a mixture of ice and water, care being taken to maintain the hydrolysis temperature below about 100° C. The hydrolysis product is the desired acrylamide. It may be purified by distillation in vacuum, although in many instances the product is of sufficient purity that any purification step is optional. Inasmuch as the acrylamide is susceptible to polymerization, distillation should be carried out in the presence of a polymerization inhibitor such as hydroquinone.

A second method for preparing N-3-oxohydrocarbon-substituted acrylamides is by the reaction of one mole of a beta-hydroxy oxohydrocarbon with one mole of an acrylonitrile in the presence of at least one mole of sulfuric acid, followed by hydrolysis. The beta-hydroxy oxohydrocarbon may be prepared by the condensation of two moles of an aliphatic oxohydrocarbon (ketone or aldehyde) or mixtures thereof containing at least one mole of an aromatic ketone containing at least one alpha-hydrogen atom. This condensation is known in the art as "aldol" condensation. It is catalyzed either by an acid or a base and takes place readily on mixing the aldehyde or ketone with the catalyst. It can be effected at temperatures within a wide range, typically from room temperature to about 200° C.

A third method for preparing the N-3-oxohydrocarbon-substituted acrylamides involves the reaction of an acrylonitrile and an alpha,beta-unsaturated ketone or aldehyde. Compounds of this type are obtained by the dehydration of the beta-hydroxy oxohydrocarbons described above.

The preparation of the monomeric N-3-oxohydrocarbon-substituted acrylamides is illustrated by the following examples.

Example 1

A mixture of 534 grams (4.46 moles) of acetophenone and 130 grams (2.45 moles) of acrylonitrile is prepared, and 455 grams (4.46 moles) of 96 percent sulfuric acid is added over 45 minutes at 20–40° C., with cooling. The reaction mixture is stirred at 40–48° C., for three hours and is then poured into an excess of water. Benzene, 2 liters, is added and the organic layer is separated and washed with warm water. Upon cooling, a crystalline product precipitates; this product is washed with benzene and petroleum ether and air-dried.

The benzene filtrate from the precipitation is distilled at 100° C./30 mm. and chilled in an ice bath as petroleum naphtha is added. A solid product is recovered and combined with the solid from the filtration. The combined product is precipitated twice from benzene by the addition of petroleum naphtha. There is obtained 271 grams of a white crystalline product melting at 125–127° C. This product, which is the desired N-(1,3-diphenyl-1-methyl - 3-oxopropyl)acrylamide (diacetophenone acrylamide) has a nitrogen content of 4.72 percent as compared with a theoretical value of 4.78 percent.

Example 2

The procedure of Example 1 is repeated except that half the acetophenone (2.23 moles) is replaced with 98 grams (2.23 moles) of acetaldehyde. The product is a mixture of N-(1-methyl-3-phenyl-3-oxopropyl)acrylamide and N-(1-phenyl-1-methyl-3-oxoproyl)acrylamide.

Example 3

The procedure of Example 1 is repeated, except that half the acetophenone (2.23 moles) is replaced by 129 grams (2.23 moles) of acetone and the acrylonitrile is replaced by an equimolar amount of methacrylonitrile. The product is a mixture of N-(1,1-dimethyl-3-phenyl-3-oxopropyl)methacrylamide and N-(1-methyl-1-phenyl-3-oxobutyl)methacrylamide.

Example 4

The procedure of Example 1 is repeated except that the acetophenone is replaced by an equimolar amount of laurophenone (phenyl 1-undecyl ketone). The product is N - [1,3-diphenyl-1-(1-undecyl)-2-(1-decyl)-3-oxopropyl]acrylamide.

Example 5

The procedure of Example 1 is repeated except that the acetophenone is replaced by an equimolar amount of propiophenone. The product is N-(1,3-diphenyl-1-ethyl-2-methyl-3-oxopropyl)acrylamide.

The principal utility of the N-3-oxohydrocarbon-substiuted acrylamides of this invention is as monomers for conversion to polymers which are useful as additives in paints, fuel oils, lubricants, and insecticidal compositions. It will be understood that for the purposes of the specification and claims of this invention the term "polymers" is used in a generic sense to include homopolymers, copolymers, and other interpolymers.

The N-3-oxohydrocarbon-substituted acrylamides are usually polymerized by the free-radical polymerization technique (also known as the addition polymerization technique). This technique consists of contacting the monomer with a polymerization initiator either in the absence or presence of a diluent at a temperature usually between 0° C. and 200° C. The polymerization initiator is a substance capable of liberating a free radical under the conditions of polymerization, e.g., benzoyl peroxide, tert-butyl hydroperoxide, cumyl peroxide, potassium or ammonium persulfate, acetyl peroxide, hydrogen peroxide, azobisisobutyronitrile, or perbenzoic acid. For reasons of economy, benzoyl peroxide or azobisisobutyronitrile are most commonly used.

The N-3-oxohydrocarbon-substituted acrylamides may also be polymerized or copolymerized using an anionic initiator such as naphthylsodium, butyllithium in tertrahydrofuran solution, or sodium metal in liquid ammonia solution.

The polymerization of N-3-oxohydrocarbon-substituted acrylamides may also be effected by other polymerization methods such as by the use of Ziegler type catalysts, gamma ray irradiation, or thermal techniques.

The diluent for the polymerization mixture may be either an inert solvent such as benzene, toluene, xylene, cyclohexane, n-hexane, naphtha, tetrahydrofuran, white oil, or dodecane; or a non-solvent such as water or liquid ammonia. Thus, the polymerization can be carried out in bulk, solution, emulsion, or suspension.

The temperature for the polymerization depends on the catalyst system employed and to some extent upon the nature of the monomers to be polymerized. Thus, the optimum temperatures for effecting the free radical catalyzed homopolymerization of the acrylamides of this invention is usually from 0° C. to 100° C, preferably 30° C. to 80° C. Similarly, the optimum temperatures for effecting the free radical catalyzed interpolymerization of the acrylamide with one or more polymerizable comonomers will vary according to the reactivity of these monomers. In most instances such temperatures likewise are within the range from about 0° C. to 100° C.

A large variety of comonomers can be used to form interpolymers with the acrylamides of this invention. For the most part, the comonomers are polymerizable vinyl monomers. They include (1) esters of unsaturated alcohols, (2) esters of unsaturated acids, (3) esters of unsaturated polyhydric alcohols (e.g., butenediol), (4) vinyl cyclic compounds, (5) unsaturated ethers, (6) unsaturated ketones, (7) unsaturated amides, (8) unsaturatted aliphaic hydrocarbons, (9) vinyl halides, (10) unsaturated acids, (11) unsaturated acid anhydrides, (12) unsaturated acid chlorides, and (13) unsaturated nitriles. Specific illustrations of such compounds are:

(1) Esters of unsaturated alcohols: Allyl, methallyl, crotyl, 1-chloroallyl, 2-chloroallyl, cinnamyl, vinyl, methylvinyl, 1-phenallyl, butenyl, etc., esters of (a) saturated acids such as for instance, acetic, propionic, butyric, valeric, caproic, stearic, etc.; (b) unsaturated acids such as acrylic, alpha-substituted acrylic (including alkacrylic, e.g., methacrylic, ethylacrylic, propylacrylic, etc., and arylacrylic such as phenylacrylic, etc.), crotonic, oleic, linoleic, linolenic, etc.; (c) polybasic acids such as oxalic, malonic, succinic, glutaric, adipic, pimelic, suberic, azelaic, sebacic, etc.; (d) unsaturated polybasic acids such as maleic, fumaric, citraconic, mesaconic, itaconic, methylenemalonic, acetylene-dicarboxylic; aconitic, etc.; (e) aromatic acids, e.g., benzoic, phenylacetic, phthalic, terephthalic, benzoylphthalic, etc.

(2) Esters of saturated alcohols such as methyl, ethyl, propyl, isopropyl, butyl, isobutyl, sec-butyl, tert-butyl, 2-ethylhexyl, cyclohexyl, behenyl, etc., with unsaturated aliphatic monobasic and polybasic acids, examples of which are illustrated above. The alkyl acrylates and methacrylates in which the alkyl radical contains from 1 to about 30 carbon atoms are especially useful because of their reactivity in interpolymerization and the particular utility and effectiveness of their interpolymers for the purposes of this invention.

(3) Esters of unsaturated polyhydric alcohols, e.g., butenediol, etc., with saturated and unsaturated aliphatic and aromatic, monobasic and polybasic acids, illustrative examples of which appear above.

(4) Vinyl cyclic compounds including (a) monovinyl aromatic hydrocarbon, e.g., styrene, o-, m-, p-chlorostyrenes, -bromostyrenes, -fluorostyrenes, -methylstyrenes, -ethylstyrenes, -cyanostyrenes, di-, tri-, and tetra-, etc., -chlorostyrenes, -bromostyrenes, -fluorostyrenes, -methylstyrenes, -ethylstyrenes, -cyanostyrenes, vinylnaphthalene, vinylcyclohexane, vinylfuran, vinylpyridine, vinylbenzofuran, divinylbenzene, trivinylbenzene, allybenzene, N-vinylcarbazole, N-vinylpyrrolidone, N-vinyloxazolidone, etc.

(5) Unsaturated ethers such as, e.g., methyl vinyl ether, ethyl vinyl ether, cyclohexyl vinyl ether, octyl vinyl ether, diallylether, ethyl methallyl ether, allyl ethyl ether, etc.

(6) Unsaturated ketones, e.g., methyl vinyl ketone, ethyl vinyl ketone, etc.

(7) Unsaturated amides, such as acrylamide, methacrylamide, N-methylacrylamide, N-phenylacrylamide, N-allylacrylamide, N-methylolacrylamide, N-allylcaprolactam, etc.

(8) Unsaturated aliphatic hydrocarbons, for instance, ethylene, propylene, butenes, butadiene, isoprene, 2-chlorobutadiene, alpha-olefins, etc.

(9) Vinyl halides, e.g., vinyl fluoride, vinyl chloride, vinyl bromide, vinylidene chloride, vinylidene bromide, allyl chloride, allyl bromide, etc.

(10) Unsaturated acids, for example, acrylic, methacrylic, propylacrylic, etc., examples of which appear above.

(11) Unsaturated acid anhydrides, e.g., maleic, citraconic, itaconic, cis-4-cyclohexene-1,2-dicarboxylic, bicyclo (2,2,1)-5-heptene-2,3-di-carboxylic, etc.

(12) Unsaturated acid halides such as cinnamoyl, acrylyl, methacrylyl, crotonyl, oleyl, fumaryl, etc.

(13) Unsaturated nitriles, e.g., acrylonitrile, methacrylonitrile and other substituted acrylonitriles.

The relative proportions of the N-3-oxohydrocarbon-substituted acrylamides and the vinyl comonomers to be used in interpolymerization depend upon the reactivity of these monomers as well as the properties desired for the interpolymers to be formed. To illustrate, interpolymers in which rigidity is desired are obtained by polymerization of a mixture of monomers having a few substitutions or substitutions of relatively short chain length. If a still higher degree of rigidity is desired, a monomer mixture may be used in which a small amount of bifunctional monomer is included such as divinylbenzene which will crosslink the polymer. On the other hand, interpolymers having a high degree of solubility in a hydrocarbon oil are obtained from a polymerization mixture containing a relatively high proportion of an oil-solubilizing monomer, i. e., one having an aliphatic group containing at least about 8 carbon atoms. For most applications, it has been found that the oil-solubilizing monomer should comprise at least about 50% (by weight), preferably at least about 75%, of the interpolymer.

The following examples are illustrative of the methods for preparing the polymers of this invention.

Example 6

A solution of 50 grams of diacetophenone acrylamide and 0.25 gram of azobisisobutyronitrile in 150 grams of benzene is purged with nitrogen and heated for four hours at 65–75° C. The mixture thickens as polymerization takes place. The solution is poured into methanol to precipitate the poly(diacetophenone acrylamide), which is then redissolved in benzene and reprecipitated with methanol. The product, a white powder, is washed with methanol and dried under vacuum at 80° C. It has a softening point of about 80° C. and melts at 140–145° C.

Example 7

Benzoyl peroxide (0.15 gram) is added to a mixture of 10 grams of diacetophenone acrylamide, 20 grams of styrene, and 30 grams of benzene. The resulting mixture is agitated under nitrogen for 4 hours at 70° C. The reaction mixture is poured into methanol and a polymeric precipitate is formed. The polymer is dissolved in benzene, precipitated by the addition of methanol and dried at 60° C. in a vacuum oven. The product, a brittle white solid, has a nitrogen content of 1.01% and contains 15.2% diacetophenone acrylamide units.

Example 8

Benzoyl peroxide (0.15 gram) is added to a mixture of 15 grams of diacetophenone acrylamide, 15 grams of styrene, and 30 grams of benzene. The mixture is agitated under nitrogen for 4 hours at 70° C. The reaction mixture is poured into methanol and a polymeric precipitate is formed. The polymer is dissolved in benzene, reprecipitated with methanol, and dried in a vacuum oven at 60° C. The product, a brittle white solid, has a nitrogen content of 1.67% and contains 35% diacetophenone acrylamide units.

Example 9

Benzoyl peroxide (0.15 gram) is added to a mixture of 15 grams of diacetophenone acrylamide, 15 grams of vinyl acetate, and 30 grams of benzene. The mixture is agitated under nitrogen at 70° C. for 3.5 hours. The reaction mixture is poured into methanol and a polymeric precipitate is formed. The polymer is dissolved in benzene, reprecipitated with methanol, and heated on a steam bath until a milky mixture is obtained. Finely divided polymer is removed by filtration and dried in a vacuum oven at 60° C. The product, a white solid, has a nitrogen content of 4.07% and contains 85% diacetophenone acrylamide units.

Example 10

Benzoyl peroxide (0.20 gram) is added to a mixture of 10 grams of diacetophenone acrylamide, 10 grams of N-vinylcarbazole, and 40 grams of benzene. The mixture is agitated under nitrogen at 65–70° C. for 20 hours. The reaction mixture is poured into methanol and a polymeric precipitate is formed. The polymer is washed with methanol and dried in a vacuum oven. The product, a white powder, has a nitrogen content of 5.38% and an intrinsic viscosity of 0.12 in dimethyl formamide at 30° C., and contains 67.5% diacetophenone acrylamide units.

Example 11

Benzoyl peroxide (0.25 gram) is added to a mixture of 12.5 grams of diacetophenone acrylamide, 12.5 grams of vinylidene chloride, and 50 grams of benzene. The mixture is agitated under nitrogen at 65–70° C. for 20 hours. The reaction mixture is poured into methanol and a polymeric precipitate is formed. The polymer is washed with methanol and dried in a vacuum oven. The product, a brittle pale yellow solid, has a nitrogen content of 2.6%, a chlorine content of 26.4%, and an intrinsic viscosity of 0.17 in dimethyl formamide at 30° C. The polymer contains 53% diacetophenone acrylamide units.

Example 12

Benzoyl peroxide (0.20 gram) is added to a mixture of 10 grams of diacetophenone acrylamide, 10 grams of methyl vinyl ketone, and 40 grams of benzene. The mixture is agitated under nitrogen at 65–70° C. for 20 hours. The reaction mixture is poured into methanol and a polymeric precipitate is formed. The polymer is washed with methanol and dried in a vacuum oven. The product, a brittle white solid, has a nitrogen content of 2.17% and an intrinsic viscosity of 0.23 in dimethyl formamide at 30° C., and contains 45% diacetophenone acrylamide units.

Example 13

Benzoyl peroxide (0.15 gram) is added to a mixture of 12.5 grams of diacetophenone acrylamide, 12.5 grams of ethyl vinyl ether, and 50 grams of benzene. The mixture is agitated under nitrogen at 60–65° C. for 40 hours. The reaction mixture is poured into methanol and a polymeric precipitate is formed. The polymer is washed with methanol and dried in a vacuum oven. The product, a brittle white solid, has a nitrogen content of 4.1% and an intrinsic viscosity of 0.17 in dimethyl formamide at 30° C., and contains 86% diacetophenone acrylamide units.

Example 14

Benzoyl peroxide (0.25 gram) is added to a mixture of 12.5 grams of diacetophenone acrylamide, 12.5 grams of acrylonitrile and 50 grams of benzene. The mixture is agitated under nitrogen at 65–70° C. for 20 hours. Solid polymer is removed from the reaction mixture, washed with methanol, and dried in a vacuum oven. The product, a white solid, has a nitrogen content of 14.7% and an intrinsic viscosity of 1.12 in dimethyl formamide at 30° C., and contains 54.5% diacetophenone acrylamide units.

Example 15

Benzoyl peroxide (0.15 gram) is added to a mixture of 12.5 grams of diacetophenone acrylamide, 12.5 grams of vinyl stearate, and 50 grams of benzene. The mixture is agitated under nitrogen at 60–65° C. for 36 hours. The reaction mixture is added to methanol and a polymeric precipitate is formed which is dried in a vacuum oven. The product, a white powder, has a nitrogen content of 3.38% and contains 71% diacetophenone acrylamide units.

Example 16

Benzoyl peroxide (0.20 gram) is added to a mixture of 10 grams of diacetophenone acrylamide, 10 grams of acrylamide, and 50 grams of benzene. The mixture is agitated under nitrogen at about 65° C. for 20 hours. A polymeric material is removed from the reaction mixture, washed with methanol, and dried in a vacuum oven. The product, a white solid, has a nitrogen content of 11.0% and contains 58% diacetophenone acrylamide units.

Example 17

Benzoyl peroxide (0.20 gram) is added to a mixture of 10 grams of diacetophenone acrylamide, 10 grams of N-vinylpyrrolidone, and 50 grams of benzene. The mixture is agitated under nitrogen at 60–65° C. for 20 hours. The reaction mixture is poured into methanol and the polymer which precipitates is dried in a vacuum oven. The product, a brittle white solid, has a nitrogen content of 6.06% and an intrinsic viscosity of 0.1 in dimethyl formamide at 30° C., and contains 83.5% diacetophenone acrylamide units.

Example 18

Benzoyl peroxide (0.20 gram) is added to a mixture of 10 grams of diacetophenone acrylamide, 10 grams of methacrylic acid, and 50 grams of benzene. The mixture is agitated under nitrogen at 60–65° C. for 20 hours. A polymeric material is obtained washed with methanol, and dried in a vacuum oven. The product, a white powder, has a nitrogen content of 2.25% and an intrinsic viscosity of 1.8 in dimethyl formamide at 30° C., and contains 50% diacetophenone acrylamide units.

Example 19

Benzoyl peroxide (0.20 gram) is added to a mixture of 10 grams of diacetophenone acrylamide, 10 grams of maleic anhydride, and 50 grams of benzene. The mixture is agitated under nitrogen at 60–65° C. for 20 hours. The polymeric material which is obtained is washed with methanol and dried in a vacuum oven. The product, a white powder, has a nitrogen content of 3.48% and an intrinsic viscosity of 0.11 in dimethyl formamide at 30° C., and contains 73% diacetophenone acrylamide units.

Example 20

A solution of 45 grams of decyl methacrylate, 5 grams of diacetophenone acrylamide and 0.25 gram of benzoyl peroxide in 40 grams of benzene is heated for 24 hours at 70° C. The polymer thus prepared is precipitated by dissolving in 200 ml. of benzene and adding to 1400 ml. of methanol. The tacky white polymer is dried at 70° C. in a vacuum oven. It contains 10% diacetophenone acrylamide units.

Example 21

The procedure of Example 20 is repeated using a mixthe weight ratio of diacetophenone acrylamide to decyl methacrylate is 9:1 instead of 1:9.

Example 22

The procedure of Example 20 is repeated using a mixture of equal amounts of diacetophenone acrylamide and ethyl acrylate. The product is a 1:1 copolymer.

Example 23

The procedure of Example 20 is repeated, except that the decyl methacrylate is replaced by 45 grams of 2-ethylhexyl acrylate. The product is an oil-soluble copolymer.

Example 24

By the method of Example 6, an oil-soluble homopolymer of N-[1,3-diphenyl-1-(1-undecyl)-2-(1-decyl)-3-oxopropyl]acrylamide is prepared.

The polymers and interpolymers of the N-3-oxohydrocarbon-substituted acrylamides of this invention are useful for many purposes. Thus, for example, they may be substituted for analogous styrene polymers, owing to the similarity of the properties of aromatic N-3-oxohydrocarbon-substituted acrylamides to styrene. The homopolymers and copolymers are useful as adhesives, as coating compositions for wood, as thickeners and the like. The monomers may also be used to form graft copolymers on cellulose, polypropylene, polystyrene, etc.; this grafting renders the treated polymers more dyeable, increases the crease resistance of fabrics made therefrom, and so forth. By virtue of their high permeability to water vapor and gas, films made from the polymers of this invention are useful in the desalination of water by such methods as electrodialysis and hyperfiltration. They are also useful in applications where a "breathable" film is desired, such as in leather treatment.

Oil-soluble polymers of the present invention, including homopolymers exemplified by that of N-[1,3-diphenyl-1-(1-undecyl)-2-(1-decyl)-3-oxopropyl]acrylamide and the copolymers of diacetophenone acrylamide with alkyl acrylates wherein the alkyl group contains from 1 to about 30 carbon atoms, are useful as lubricant additives. When added to a lubricant, these polymers impart detergent properties, improve viscosity index values, inhibit foaming, and lower the pour point of the lubricant. Mineral lubricating oils are especially susceptible to such improvement. The commonly used oils are those having viscosity values ranging from about 50 SUS (Saybolt Universal seconds) at 100° F. to 500 SUS at 210° F. and are preferably refined mineral lubricating oils from SAE 5 to SAE 120 grades. Other lubricating oils such as vegetable oils, animal oils, silicone oils, and synthetic polyester oils likewise are susceptible to improvement by the incorporation of these polymers. The concentration of the polymer when used as a viscosity index improver or pour point depressant in a lubricant ranges from about 0.1 to 10 parts by weight, more often from 0.5 to 5 parts, per 100 parts of lubricating oil. When used as an anti-foam agent, the polymer may be present in amounts as low as 1–2 parts per million parts of oil. Lubricants containing the polymers of this invention may also contain other conventional additives such as metal detergents, inhibitors, load-carrying additives, supplemental viscosity-improving agents and the like.

The viscosity index-improving properties of the polymers of this invention are illustrated by the following test in which the viscosity index is measured for an SAE 10W–30 base oil, the base oil containing a decyl methacrylate homopolymer, and the base oil containing the polymer of Example 20. The results are given in the following table.

| Lubricant | Polymer concentration Percent | Viscosity index | "E Value" |
|---|---|---|---|
| Base oil | | 99.0 | |
| Base oil plus decyl methacrylate | 1 | 132.0 | 1.21 |
| Base oil plus product of Ex. 20 | 2 | 140.7 | 1.23 |
| | 1 | 126.0 | 1.37 |
| | 2 | 138.0 | 1.41 |

The "E Value" in the above table is a measure of the viscosity-temperature characteristics of the additive. In general, a composition furnishing an "E Value" of less than 1.0 is primarily a thickener, while one furnishing an "E Value" greater than 1.0 is a temperature-viscosity improver. The higher the "E Value," the more effective is the additive. It will be seen that the viscosity index values for the compositions of this invention are approximately the same as those for decyl methacrylate homopolymer, but that the "E Values" are higher than those for decyl methacrylate homopolymer.

What is claimed is:

1. A lubricating composition comprising a major amount of a mineral lubricating oil and up to about 10 parts by weight, per 100 parts of said mineral oil, of a polymer of an N-3-oxohydrocarbon-substituted acrylamide having the general formula

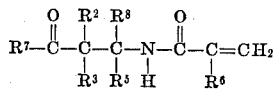

wherein $R^7$ and $R^8$ are each alkyl or aryl, at least one of $R^7$ and $R^8$ being aryl; $R^2$, $R^3$ and $R^5$ are each hydrogen or a hydrocarbon mineral radical; and $R^6$ is hydrogen or a lower alkyl radical.

2. A lubricating composition according to claim 1 wherein $R^7$ and $R^8$ are both aryl.

3. A lubricating composition according to claim 2 wherein the polymer is an oil-soluble interpolymer of an N-3-oxohydrocarbon-substituted acrylamide with an alkyl acrylate or methacrylate wherein the alkyl radical contains from 1 to about 30 carbon atoms.

4. A lubricating composition according to claim 1 wherein the N-3-oxohydrocarbon-substituted acrylamide is N-(1,3-diphenyl-1-methyl-3-oxopropyl)acrylamide.

5. A lubricating composition according to claim 4 wherein the polymer is an interpolymer of N-(1,3-diphenyl-1-methyl-3-oxopropyl)acrylamide with an alkyl acrylate or methacrylate wherein the alkyl group contains from 1 to about 30 carbon atoms.

References Cited

UNITED STATES PATENTS 2,737,496 3/1956 Catlin.
3,277,056 10/1966 Coleman.
3,341,455 9/1967 Coleman.

PATRICK P. GARVIN, *Pricary Examiner.*

U.S. Cl. X.R.

210—321; 252—8.57; 44—62, 71; 167—22; 8—116.2, 115.5; 260—80.3, 85.5, 86.1, 87.5, 89.7, 561, 562; 106—243; 117—148, 149